US008899036B2

(12) United States Patent
Cherepashenets et al.

(10) Patent No.: US 8,899,036 B2
(45) Date of Patent: Dec. 2, 2014

(54) ADVANCED HIGH ENERGY WAVE POWER MODULE

(76) Inventors: Yuriy Cherepashenets, Waltham, MA (US); Yakov Regelman, Newton, MA (US)

( * ) Notice: Subject to any disclaimer, the term of this patent is extended or adjusted under 35 U.S.C. 154(b) by 82 days.

(21) Appl. No.: 13/374,434

(22) Filed: Dec. 28, 2011

(65) Prior Publication Data

US 2012/0167563 A1 Jul. 5, 2012

Related U.S. Application Data

(60) Provisional application No. 61/460,252, filed on Dec. 29, 2010.

(51) Int. Cl.
*F03B 13/12* (2006.01)
*F03B 13/18* (2006.01)
(52) U.S. Cl.
CPC .......... *F03B 13/1855* (2013.01); *F03B 13/187* (2013.01); *Y02E 10/38* (2013.01)
USPC ............................ 60/504; 290/42; 417/331
(58) Field of Classification Search
USPC .......... 60/495–507; 290/42, 53; 417/330–333
See application file for complete search history.

(56) References Cited

U.S. PATENT DOCUMENTS

| | | | | |
|---|---|---|---|---|
| 1,647,025 A * | 10/1927 | Stich | ................................ | 60/498 |
| 2,749,085 A * | 6/1956 | Searcy | ............................. | 60/505 |
| 3,567,953 A * | 3/1971 | Lord | ................................ | 290/42 |
| 3,598,505 A * | 8/1971 | Greene et al. | .................. | 417/220 |
| 3,777,494 A * | 12/1973 | Soderlund | ....................... | 60/507 |
| 4,398,095 A * | 8/1983 | Ono | ................................ | 290/53 |
| 4,413,956 A | 11/1983 | Berg | | |
| 4,630,440 A | 12/1986 | Meyerand | | |
| 4,683,719 A * | 8/1987 | Martinak | ......................... | 60/398 |
| 4,754,157 A * | 6/1988 | Windle | ............................. | 290/53 |
| 4,954,052 A * | 9/1990 | Simmons | ....................... | 417/331 |
| 5,374,850 A * | 12/1994 | Cowen | ............................ | 290/53 |
| 5,701,740 A * | 12/1997 | Tveter | ............................. | 60/505 |
| 5,975,865 A * | 11/1999 | Manabe | ......................... | 417/331 |
| 6,575,712 B1 * | 6/2003 | Slavchev | ........................ | 417/331 |
| 6,717,284 B2 * | 4/2004 | Lin | ................................ | 290/53 |
| 6,857,266 B2 * | 2/2005 | Dick | ............................... | 60/496 |
| 6,953,328 B2 | 10/2005 | Welch | | |
| 7,059,123 B2 | 6/2006 | Welch | | |
| 7,188,471 B2 | 3/2007 | Walters | | |
| 7,216,483 B2 | 5/2007 | Takeuchi | | |
| 7,258,532 B2 | 8/2007 | Welch | | |
| 7,713,032 B2 * | 5/2010 | Davis, Sr. | ...................... | 417/331 |
| 7,791,213 B2 * | 9/2010 | Patterson | ......................... | 290/53 |
| 7,891,183 B2 * | 2/2011 | Al-Huwaider | .................. | 60/498 |
| 8,007,252 B2 * | 8/2011 | Windle | .......................... | 417/331 |

(Continued)

*Primary Examiner* — Thomas Denion
*Assistant Examiner* — Mickey France

(57) ABSTRACT

A wave power module and each of a plurality of the power modules convert energy from high energy waves and swells into usable power on an industrial scale. These modules are connected by piping to the consumer of the mechanical energy in the form of the high pressurized working fluid. A submerged immovable platform and a submerged movable platform connected to a float by outer and inner power flexible links with variable free lengths and compressible chambers installed between the immovable and movable platforms. The variable buoyancy force of the float is converted into driving force, which acts through the movable platform on the compressible chambers to discharge a flow of the high pressurized working fluid to the consumer. The stroke of the movable platform and compressible chambers is less than the height of waves or swells.

8 Claims, 3 Drawing Sheets

(56) References Cited

U.S. PATENT DOCUMENTS

| | | | |
|---|---|---|---|
| 2004/0071566 A1* | 4/2004 | Hill, Jr. | 417/333 |
| 2006/0202483 A1* | 9/2006 | Gonzalez | 290/53 |
| 2007/0018458 A1* | 1/2007 | Martinez | 290/53 |
| 2007/0253841 A1 | 11/2007 | Burns | |
| 2008/0231054 A1 | 9/2008 | Estefen | |
| 2009/0165454 A1* | 7/2009 | Weinberg | 60/497 |
| 2010/0043425 A1* | 2/2010 | Dragic | 60/504 |
| 2010/0122529 A1* | 5/2010 | Kroll | 60/504 |
| 2011/0042955 A1 | 2/2011 | Benson | |
| 2011/0074159 A1 | 3/2011 | Stromotich | |
| 2011/0113771 A1* | 5/2011 | Foster et al. | 60/501 |

\* cited by examiner

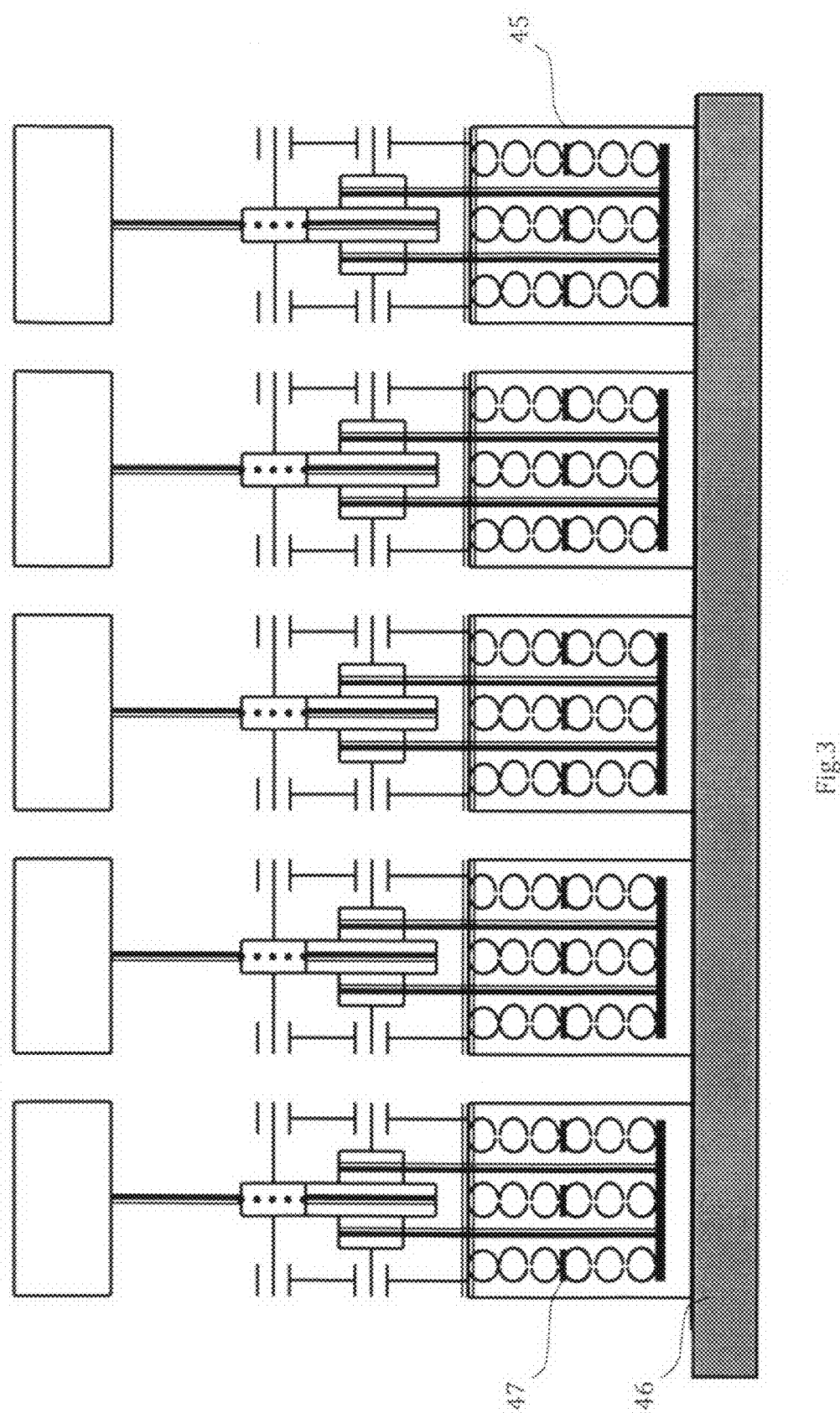

ADVANCED HIGH ENERGY WAVE POWER MODULE

CROSS-REFERENCE TO RELATED APPLICATIONS

This application claims the benefit of Provisional Patent Application Ser. No. 61/460,252, filed Dec. 29, 2010 by the present inventors.

STATEMENT REGARDING FEDERALLY SPONSORED RESEARCH OR DEVELOPMENT

Not Applicable

BACKGROUND OF THE INVENTION

The following is a tabulation of some prior art that presently appears relevant:

| U.S. Patent | | | |
| --- | --- | --- | --- |
| Pat. No. | Kind Code | Issue Data | Patentee |
| 4,413,956 | A | Nov. 8, 1983 | Berg |
| 4,630,440 | A | Dec. 23, 1986 | Meyerand |
| 6,953,328 | B2 | Oct. 11, 2005 | Welch et al |
| 7,059,123 | B2 | Jun. 13, 2006 | Welch et al |
| 7,188,471 | B2 | Mar. 13, 2007 | Walters |
| 7,216,483 | B2 | May 15, 2007 | Takeuchi |
| 7,258,532 | B2 | Aug. 21, 2007 | Welch et al |

| U.S Patent Application Publications | | | |
| --- | --- | --- | --- |
| Publication Number | Kind Code | Publication Date | Applicant |
| 20070253841 | A1 | Nov. 1, 2007 | Burns |
| 20080231054 | A1 | Sep. 25, 2008 | Estefen |
| 20110042955 | A1 | Feb. 24, 2011 | Benson |
| 20110074159 | A1 | Mar. 31, 2011 | Stromotich |

This application is related to generating energy from water motion on the surface of the ocean, sea, or lake. In particular, this application relates to an advanced method and apparatus realized in an Advanced High Energy Wave Power Module for converting energy from high energy swells and waves to useful forms of mechanical power.

The contemporary directions of generating clean energy without exhaust gases, which pollute the atmosphere, are based mainly on converting solar energy or solar born wind energy directly into useful power. Both directions cannot compete economically with modern technology of generating power based on fossil fuel. The main reason for this is the low density of power generated by solar or wind energy. For example, the maximum density of power generated by solar energy in a hot desert is around 320 watts per square meter. The modern offshore 5 MW wind turbine with diameter of blades up to 120 meters have the density of generated useful power around 440 watt per square meter of air space.

The density of power depends on the density of the medium that accumulates the solar energy. As is known the density of water is almost 1000 times higher than the density of air. Thus, water in the form of swells and waves can accumulate much more solar energy than air in the form of wind.

According to the Techno-Economic Study "The Development of Wave Power", National Engineering Laboratory, Glasgow, Scotland, 1976 wave power is proportional to the product of the square of wave height and the period of a wave and can be determined with this formula:

$$P = \rho g^2 (H^2 T)/64\sigma,$$

where
$\rho$—density of water,
$g$—acceleration due to gravity,
$H$—significant wave height,
$T$—period of wave.

As an example, consider moderate ocean swells, in deep water, a few kilometers off a coastline, with a wave height of 3 meters and a wave period of 8 seconds the power of the wave is 36 kW per meter of wave crest length.

The considerable power of waves attracts and impedes new technologies because the turbulent forces of waves could damage or even destroy the devices that convert the energy of waves into useful power. But solving the issues in transforming the energy of high energy waves into useful power could create a new opportunity for society to produce clean energy with efficiency comparable to that of a modern power plant working on hydrocarbon fuels.

The largest numbers of prior art apparatus which have attempted to harness energy from the moving surface of the ocean have used devices which float and operate on the surface of the ocean to generate mechanical or electrical power. Such devices as Stephen Salter's Duck and the Pelamis Wave Energy Converter are operated with waves of moderate energy. In the case of high energy waves, the operation of the apparatus on the surface of the ocean is restricted because of the possibility of turbulent forces damaging or even destroying the apparatus. Other devices convert the energy of waves into useful power through a point absorber by the float that transfers the energy of the waves to a transforming mechanism, which is submerged to prevent it from being destroyed by turbulent forces.

These mechanisms could be classified into two types, namely electrical generators, and hydraulic or pneumatic converters, particularly hydraulic cylinders that pump water under pressure or pneumatic cameras in which air is compressed by the variable height of passing waves.

The most advanced Power Buoy PB 150 developed by Ocean Power Technology has a point absorber with diameter of the float around 10 meters connected to a submerged vertical mechanism with a height of around 35 meters operated with waves ranging from 1.5 meters to 7 meters in height and generating maximum peak-rated of 150 kW electrical power. The height of mechanism was determined by direct driving from float to generator.

Both U.S. Pat. No. 4,413,956 A to John I. Berg (1983) and U.S. Pat. No. 6,953,328 B2 (2005) to Welch, Jr. have shown the method and apparatus to utilize the energy of waves on the base wave pump apparatus using cylinders with the piston connected directly to the moving float or buoyancy block.

Converting wave energy into useful energy using submersible hydraulic cylinders, pistons or housing cylinders that are driven by the float are practically possible only for waves of moderate height with a moderate energy level because it is impractical to have submerged cylinders with a stroke of 3 or more meters.

Disadvantages of the submersible hydraulic cylinders for wave energy converting are the following:

the long stroke of the movable part of the hydraulic cylinder is equal to the movement up and down of the float, which is moved by the action of waves, such that given a wave of height three meters the movable part of the cylinder should move by three meters; manufacturing of such hydraulic cylinders is a difficult technical challenge and expensive, losses of energy due the friction of motion in a pair of housing cylinder-piston, which reduces the efficiency of conversion of wave energy into useful energy, the maintenance of hydraulic cylinders, including replacement of seals in the movable joints operating in salt water, which would require dismantling and disassembly of hydraulic cylinders.

For high energy capacity waves with a height of seven meters and more use of hydraulic cylinders is impractical because the cost of such devices and their reliability cannot compete with modern methods of energy generation.

U.S. Pat. No. 4,630,440 A to Meyerand (1986) has shown a method and apparatus for converting wave energy into useful energy using submersible low-pressure compressible chambers. Variable compression in chambers depends on the hydrostatic pressure of the water column above the compressible chambers during the passage of the waves.

Disadvantages of the low pressure compressible chambers for wave energy converting are the following:

low water pressure in the hydraulic turbine due to low fluctuation of hydrostatic pressure during the passage of the waves. If the height of the wave is three meters an increment of pressure in compressible chambers is only approximately 0.3 bar, pressure losses due to friction with the transport of water through the piping may be significant comparable to increment of pressure 0.3 bar, low efficiency of conversion of wave energy into usable energy.

BRIEF SUMMARY OF THE INVENTION

The above identified problems are solved by the method and apparatus of Advanced High Energy Wave Power Module and a plurality of Advanced High Energy Wave Power Modules disposed in a surrounding body of water at a depth at which the water is under a selected pressure according to mode of passing high energy swells.

In a first embodiment the Advanced High Energy Wave Power Module provides a method of converting the power of high energy swells and waves into useful power in the form of a flow of the high pressurized working fluid to the consumer of mechanical power. This method comprising:

transforming high amplitude movement of the float on high energy swells and waves into selected small stroke of a submerged movable platform relative to the submerged immovable platform, and the corresponded small stroke of the compressible chambers mounted by the upper bases on the immovable platform and by the lower bases on the movable platform, transforming the buoyancy force of the float into increased driving force acting on the movable platform, which compresses the compressible chambers with force equal to the buoyancy force multiplied by the ratio of the design height of a wave to the selected small stroke of the movable platform, producing flow of the high pressurized working fluid discharged from the compressible chambers working in parallel, summarizing of flows of the high pressurized working fluid from a plurality of Advanced High Energy Wave Power Modules, transporting summarized flow of the high pressurized working fluid to a consumer of mechanical power, which can be hydraulic turbine-generator, hydraulic turbine-compressor, reservoir of peak power plant, or desalination station.

In a second embodiment, the Advanced High Energy Wave Power Module provides an apparatus to convert the power of high energy swells and waves into useful power in the form of a flow of the high pressurized working fluid to the consumer of mechanical power. The apparatus comprising:

a float jointed to an upper end of an outer power flexible link, an outer power flexible link with variable length directed by a guide roller to a pulley-converter with a circumference equal to or greater than the design height of a wave, and jointed by its lower end to a pulley-converter mounted rigidly on a common rotated shaft with driving pulleys, the shaft is installed rigidly through the brackets on an immovable platform, the immovable platform connected to a supporting structure submerged in a surrounding body of water at a depth at which the water is under a selected pressure, a movable platform, which has a selected stroke relative to immovable platform, such that the selected stroke is less than or equal to the design height of a wave times the ratio of the diameter of the pulley-converter to the diameter of the driving pulley, compressible chambers with variable volumes and spring-loaded compression of bodies mounted in parallel and jointed by their upper bases to the immovable platform and by their lower bases to the movable platform, at least two driving pulleys with circumference of each equal to or greater than the selected stroke of the movable platform mounted rigidly on the common rotated shaft with the pulley-converter, at least two inner driving flexible links of variable length each jointed by its upper end to each driving pulley, respectively, and each jointed by its lower end to the movable platform, cavities of the compressible chambers with variable volumes filled with working fluid connected through the pressure openings in the upper bases to pressure conduits connected to an inlet of at least one pressure check valve and connected through the suction openings in the upper bases to suction conduits connected to an outlet at least one suction check valve, at least one pressure check valve, an outlet of which is connected hydraulically through the pressure piping to a consumer of useful power in the form of a discharged flow of high pressurized working fluid, when the pressure check valve is opened and the suction check valve is closed and disconnects hydraulically the cavities to a source of the working fluid under action of an increased pressure inside of the cavities under action by the driving force, as the float moves upward under action of passing swells and waves, at least one suction valve, the inlet of which is connected hydraulically to one of the sources of the working fluid that is sucked into the cavities under action of difference in pressures of the source of working fluid and inside the cavities, when the suction check valve is opened, the outlet of which is connected hydraulically to the cavities, and the pressure check valve is closed and disconnected hydraulically to the consumer of useful power under the action of decreased in pressure inside the cavities, that occurs when the float moves downward under the force of its own weight, a plurality of the Advanced High Energy Wave Power Modules is jointed to supporting structure and each of these Modules is connected through the suction check valves to the source of working fluid, and through the pressure check valves to the pressure piping, which is connected to the consumer of useful power in the form of summarized flow of the high pressurized working fluid.

As the result of these improvements a plurality of Advanced High Energy Wave Power Modules is disposed in the surrounding body of water at a depth where the water is under a selected pressure, and with configuration of layout according to the selected model of swells and waves have following advantage:
  operating in the rough ocean conditions with high energy swells and waves,
  producing the flow of the high pressurized working fluid from high energy swells and waves.

BRIEF DESCRIPTION OF DRAWINGS

FIG. 3 is a diagram of the example of a plurality of the Advanced High Energy Wave Power Modules jointed to the supporting structure.

DRAWINGS

Reference Numerals

Figure 1:
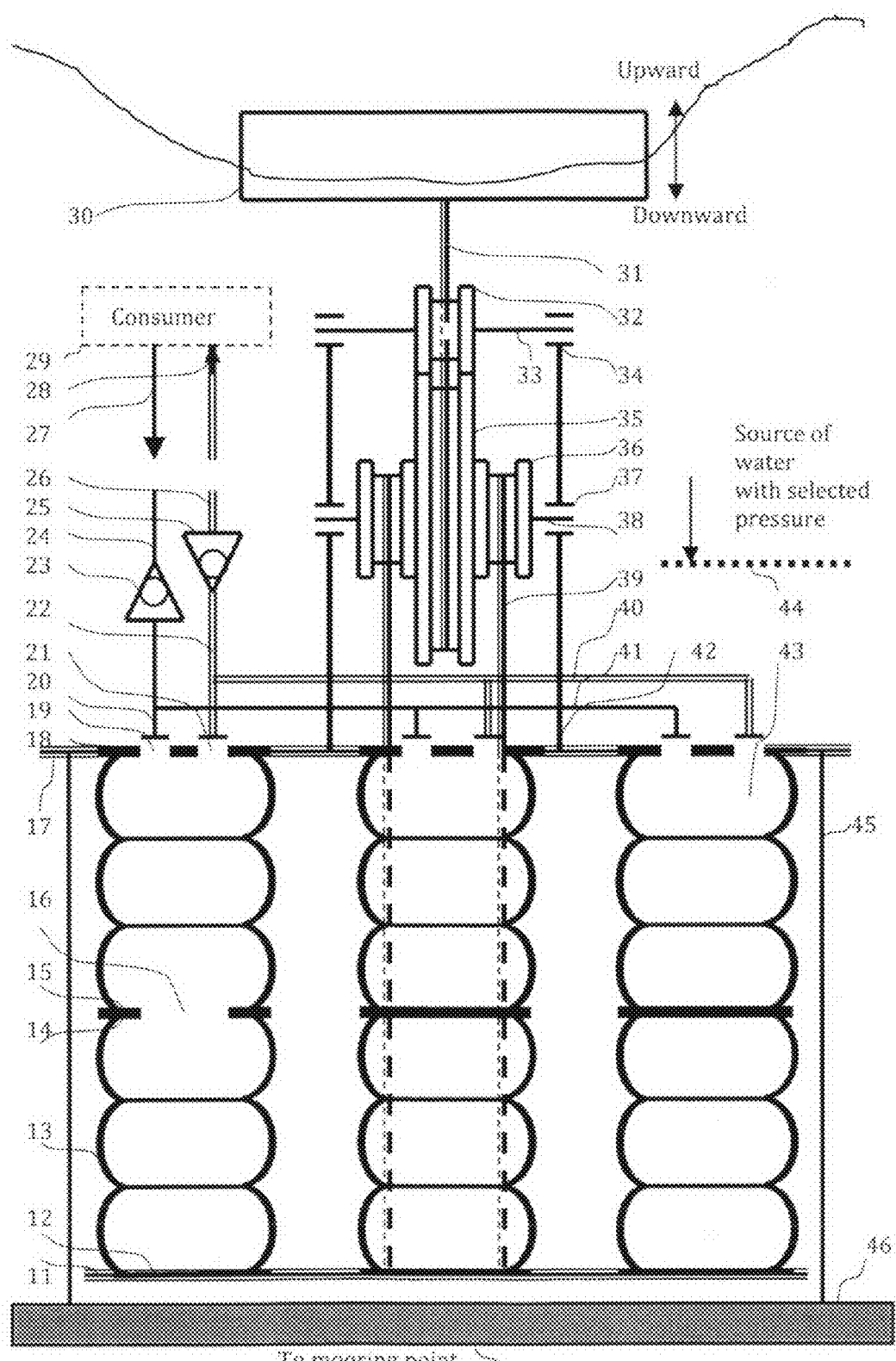
FIG. 1 is a diagram of the Advanced High Energy Wave Power Module

10. Mooring point of the submerged immovable platform
11. Submersed movable platform
12. Lower bases of the compressible chambers
13. Compressible chambers or assemblies of the series-connected compressible chambers
14. Connected lower bases of the assemblies of the series-connected compressible chambers
15. Connected upper bases of assemblies of series-connected compressible chambers
16. Opening in connected bases of assemblies of series-connected compressible chambers
17. Submerged immovable platform
18. Upper bases of the compressible chambers
19. Suction openings of the compressible chambers
20. Suction piping
21. Pressure openings of the compressible chambers
22. Pressure piping
23. Suction check valve
24. Suction piping
25. Pressure check valve
26. Pressure piping
27. Discharge piping from the consumer
28. Pressure piping to the consumer
29. Consumer
30. Float
31. Outer power flexible link with variable free length
32. Guide roller
33. Shaft of the guide roller
34. Bearing of the guide roller
35. Pulley-converter connected to outer power flexible link
36. Driving pulleys connected to inner driving flexible links with variable free length
37. Bearing of the pulley-converter and the driving pulleys
38. Shaft of the pulley-converter and the driving pulleys
39. Inner driving flexible links with variable free length
40. Pressure piping connected pressure openings of the compressible chambers
41. Suction piping connected suction opening of the compressible chambers
42. Brackets
43. Cavities of compressible chambers
44. Source of water
45. Legs of the immovable platform
46. Supporting structure
47. Advanced High Energy Wave Power Module

DETAILED DESCRIPTION OF THE INVENTION

Generating power in an efficient way from sources of renewable energy is important as traditional energy sources are becoming depleted and there is increasing thermal and chemical pollution of the environment.

The Advanced High Energy Wave Power Module relates to the method and apparatus for converting the renewable energy of high energy swells and waves to useful mechanical power in the form of flow of the high pressurized working fluid discharged from compressible chambers to a consumer.

In rough ocean conditions the operation of the Advanced High Energy Wave Power Module and a plurality of Advanced High Energy Wave Power Modules is ensured by the development of three advantaged steps which are the following:
  Advanced High Energy Wave Power Modules are submerged in a surrounding body of water at a depth at which the water is under a selected pressure that excludes the destructive impact of the turbulent forces of the high energy swells and waves to an apparatus,
  providing the selected small stroke of the compressible chambers that improved operation conditions of the compressible chambers, when the float moves upward and downward with high amplitude corresponding to the high energy swells and waves,
  providing increased driving force on the compressible chambers is allowed to produce the flow of high pressurized working fluid to the consumer and to increase the efficiency of transforming the high energy waves to useful power.

Advanced High Energy Wave Power Modules can be used in many applications, most important of them are the following:
  transforming energy of high energy swells and waves into useful power in the form of a flow of high pressurized working fluid to pump water to a hydraulic turbine-generator, hydraulic turbine-compressor, reservoir of peak power plant, or desalination station.
  A plurality of Advanced High Energy Wave Power Modules jointed to the supporting structure can also be used as a system, which can operate close to the coast line to produce useful power and simultaneously to protect the coast lines from the destructive forces of high energy swells and waves.

The Advanced High Energy Wave Power Modules can be connected with the consumer 29 of mechanical power in the form of a flow of the high pressurized working fluid with two options:
  an open loop of circulated water,
  a closed loop of circulated working fluid.

When the Modules are connected in the open loop the outlet 27 of consumer 29 is disconnected from the suction pipe 24, such that the water from consumer 29 is discharged back to the source of water 44. Water from the source of water 44 runs to the compressible chambers 13 through the suction pipe 24 and the opened suction check valve 23 under action of a difference in pressures between the source of water 44 at the selected deep and in the cavities 43 of compressible chambers 13.

When the Modules are connected in the closed loop the outlet 27 of consumer 29 is connected to the suction pipe 24, so that the working fluid from consumer 29 is discharged back to the compressible chambers 13 through the suction pipe 24 and the opened suction check valve 23 under action of the difference in pressures of the source of water 44 at the selected depth and the cavities 43 of compressible chambers 13.

In the case of the closed loop the impact on the environment will be minimized, because the working fluid remains inside of the closed loop and energy is transferred from high energy swells and waves to the consumer 29 in the form of a flow of high pressurized working fluid through the pressure piping 26.

The Advanced High Energy Wave Power Module has the submerged immovable platform 17 and the submerged movable platform 11.

There are two options:
submerged immovable platform 17 fixed rigidly through the legs 45 to the mooring points located at the ocean floor, or to the supporting structure 46,
submerged immovable platform 17 connected through the flexible link to the mooring point 10 located at ocean floor, or supporting structure 46 that is immovable relative to the ocean floor. In this case, the submerged immovable platform with all equipment installed on the platform, excluding the float, must have self-positive buoyancy in working conditions under the full load of fluid in the compressible chambers.

FIG. 1 is the diagram of the configuration of the Advanced High Energy Wave Power Module that comprises:
submerged immovable platform 17 connected through the mooring points 10 to the supporting structure 44 with the following equipment installed on the platform 17:
rotated pulley-converter 35 rigidly connected to the shaft 38 with the bearings 37, which are rigidly jointed through the brackets 42 to the submerged immovable platform 17,
rotated guide roller 32 rigidly connected to the shaft 33 with bearings 34, which are rigidly jointed through the brackets 42 to the submerged immovable platform 17,
rotated driving pulleys 36 rigidly connected to the shaft 38,
the outer power flexible link 31 with variable free length jointed by its lower end to the pulley-converter 35, passing through the guide roller 32, and connected by its upper end to the float 30,
the inner driving flexible links 30 with variable free length working in parallel and respectively connected to the driving pulleys 36 and at its lower ends to the submersed movable platform 11,
pressure piping 22, 40 that connects all outlet openings 21 of the compressible chambers 13 and is connected to the pressure check valve 25 to the pressure piping 26 and to the pressure piping 28 of the consumer 29,
suction piping 20, 41 that connects all suction openings 19 of the compressible chambers 13 and is connected the suction check valve 23 to the suction piping 24 and to the discharge piping 27 of the consumer 29,
compressible chambers 13 with the variable volume of the cavities 43 are mounted in parallel between the submerged immovable platform 17 and the submerged movable platform 11,
compressible chambers 13, connected in series, have common internal cavities through the opening 16 in the jointed bases 14, 15, upper bases 18 of the compressible chambers 13 or uppermost upper bases 18 of the assemblies of the compressible chambers 13 connected in series and jointed to the submerged immovable platform 17,
lower bases 12 of compressible chambers 13 or lowest lower bases 12 of the assemblies of the compressible chambers 13 connected in series and jointed to the submerged movable platform 11,
bases 18 of the compressible chambers 13 with the pressure openings 21 are connected in parallel through the pressure piping 31 to the pressure check valve 25 that is connected to the pressure piping 26, which is connected to the pressure piping 28 of the consumer 29,
suction openings 19 of the compressible chambers 13 are connected in parallel through the suction piping 41 to the suction check valve 23 that is connected to suction piping 24 which is connected to the discharge piping 27 of the consumer 29.

Figure 2:
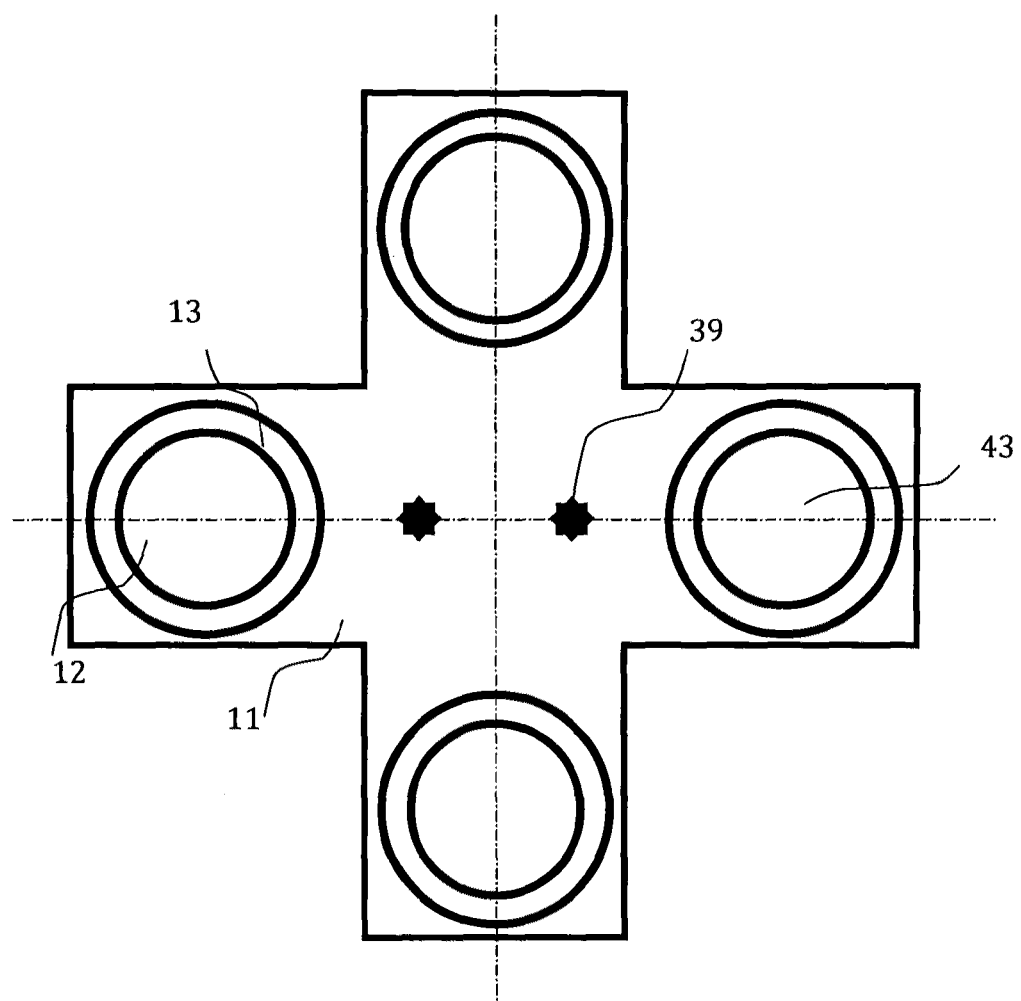
FIG. 2 is a sectional plan view of the compressible chambers on the submerged movable platform

FIG. 2 is an example of the sectional plan view of the compressible chambers 13 installed on the submerged movable platform 11. There are four compressible chambers 13 shown. This number and the disposition of the compressible chambers 13 on the submerged movable platform 11 may be variable.

FIG. 3 is a diagram of the example of a plurality of the Advanced High Energy Wave Power Modules 47 jointed at the legs 45 to the supporting structure 46. Such a unit can be manufactured as a completed assembly and delivered to the field site to produce and transport a summarized flow of the high pressurized working fluid on an industrial scale to the consumer 29.

Operation

Extraction of the portion of useful energy from the energy of the passing waves and swells when the float 21 is moving upward comprising:
increasing the buoyancy force on the float 30 and increasing the force of the tension on the outer power flexible link 31,
rotating the pulley-converter 35 connected to the outer power flexible link 31 and driving pulleys 36 rigidly connected to the shaft 38, and increasing the free length of the outer power flexible link 31 between the float 30 and the guide roller 32,
unbalancing the momentums acting on the pulley-converter 35 from increased buoyancy force on the float 30 and from the tension force acting on the inner driving flexible links 39 jointed to the driving pulleys 36 and the submerged movable platform 11,
moving upward of the submerged movable platform 11 and respectively increasing pressure of working fluid in the compressible chambers 13 and the spring-loaded force of the compressible chambers 13 to balance momentums acting on the pulley-converter 35 and driving pulleys 36 in a new equilibrium position of the float 30 and the submerged movable platform 11,
rotating of the driving pulleys 36 and reducing the free length of the inner driving flexible links 39 between the submerged movable platform 11 and driving pulleys 36,
opening of the pressure check valve 25 under action of an increased pressure in the cavities 43 of the compressible chambers 13 and discharging a flow of the high pressurized working fluid from the cavities 43 through the pressure openings 21, pressure piping 22, pressure piping 40 and pressure check valve 25 to the pressure piping 26 connected to the pressure piping 28 of the consumer 29,
repetition of discharging flow of the high pressurized working fluid to the consumer 29 during passage of waves and swells, when the float 30 moves upward.

Moving the float 30 downward activates the process of suction of working fluid into the cavities 43 of the compressible chambers 13 through suction piping 24 connected from one side to discharge piping 27 of the consumer 29, or to a source of the working fluid, and from another side to the suction check valve 23 connected through the suction piping 41, suction conduits 20 to the suction openings 19 of the cavities 43.

The suction of working fluid to the cavities 43 comprising:

decreasing the buoyancy force on the float 30 moving downward and decreasing the force of the tension on the outer power flexible link 31 jointed to the pulley-converter 35 and decreasing the pressure of the working fluid in the compressible chambers 13, and the spring-loaded force of the compressible chambers 13 to balance momentums acting on the pulley-converter 35 and driving pulleys 36 resulting in a new equilibrium position of the float 30 and the submerged movable platform 11, balancing a momentum acting on the pulley-converter 35 from a decreased tension force on the outer flexible link 31 jointed to the pulley-converter 35 and a momentum acting on the driving pulleys 36 from the tension force acting by the spring-loaded force of the compressible chambers 13 acting on the inner driving flexible links 39 jointed by the each upper end to each driving pulley 36 and by the each lower end to the submerged movable platform 11, downward movement of the submerged movable platform 11 accompanied by the increasing volumes of the cavities 43 and decreasing pressure of the fluid in the compressible chambers 13, rotating the pulley-converter 35 in the opposite direction and decreasing the free length of the outer power flexible link 31 between the float 30 and the guide roller 32, rotating the pulley-converter 35 in the opposite direction and increasing the free length of the inner driving flexible links 39 between the submerged movable platform 11 and driving pulleys 36, opening of the suction check valve 23 under action of difference in pressures in the suction piping 24 and the cavities 43, suction of the working fluid from discharge piping 27 of the consumer 29 or from another source of working fluid, through the suction check valve 23, suction openings 19 in the upper bases 9 into cavities 43 of the compressible chambers 13, leading the process of the suction until the new equilibrium position of the float 30 and the submerged movable platform 11, repetition of the suction of the fluid into the cavities 43 of the compressible chambers 13 during the passage of waves and swells, when the float 30 moves downward.

A plurality of the Advanced High Energy Power Modules supply useful power in the form of a flow of the high pressurized working fluid to the consumer 29 on an industrial scale during passage of waves and swells.

It is obvious that the present invention is not restricted to the embodiments presented above. The present invention can be modified within the basic idea to include summarizing additional ideas for using extracted energy from waves and swells as a mechanical energy, or as a source of accumulated energy in such mediums as some fluids, or water, or air under pressure.

We claim:

1. A method for generating energy from the energy sources of swells and waves, comprising:
  a. providing a float jointed to an upper end of an outer power flexible link with a variable free length moving upward under the action of passing swells and waves and downward under action of its own weight,
  b. providing an increase of the free length of said outer power flexible link jointed by its lower end to a pulley-converter through the reeling off of said outer power flexible link from said pulley-converter, when said float is moving upward,
  c. providing a decrease of the free length of said outer power flexible link through the reeling up of said outer power flexible link on said pulley-converter, when said float is moving downward,
  d. providing a transfer of a buoyancy force of said float moving upward through said outer power flexible link to said pulley-converter mounted on a rotated shaft, which is fixed with brackets to an immovable platform submerged in a surrounding body of water to a depth at which the water is under a selected pressure,
  e. transforming of said buoyancy force of said float moving upward to a torque on said shaft proportional to the diameter of said pulley-converter and said buoyancy force,
  f. providing such a size of said diameter such that the circumference of said pulley-converter would be equal to or greater than a design height of a wave,
  g. providing at least two driving pulleys with equal diameters and at least two inner driving flexible links with a variable free length working in parallel and respectively connected to the driving pulleys, each driving flexible link being connected at its upper end to a driving pulley fixed rigidly on said rotated shaft, which is common with said pulley-converter, and by lower ends to a movable platform submerged in a surrounding body of water to a depth at which the water is under a selected pressure, such that the free length of said inner driving flexible links will be decreased by reeling up on said driving pulleys when said float moves upward,
  h. providing an amplified driving force on said inner driving flexible links comparable to a buoyancy force on said outer power flexible link by converting said torque on said shaft to said driving force according to a ratio of said diameter of said pulley-converter to a diameter of said driving pulley,
  i. providing such a size of said diameter of each said driving pulley, such that the circumference of each said driving pulley is equal to or greater than the selected stroke of said movable platform relative to said immovable platform,
  j. transferring said amplified driving force through said inner driving flexible links to said movable platform connected to said immovable platform through compressible chambers filled with a working fluid, jointed to said immovable platform by upper bases and jointed to said movable platform by lower bases, submerged in a surrounding body of water to a depth at which the water is under a selected pressure,
  k. providing a stroke of said movable platform upward to said immovable platform under an action of said amplified driving force on said inner driving flexible link when said float is moving upward under action of passing waves,
  l. providing a decrease of said stroke of said movable platform relative to said immovable platform in comparison to the wave height according to the ratio of said diameter of said pulley-converter to said diameter of said driving pulley,
  m. converting said driving force of said inner driving flexible link to spring-loaded compression of bodies of said compressible chambers and the high pressure of said working fluid in cavities of said compressible chambers, such that a pressure check valve hydraulically connected with said cavities will open to discharge high pressurized working fluid to pressure piping, when said float is moving upward under action of passing waves, n. transporting to a consumer of useful power an extracted portion of useful power in the form of a flow of said high pressurized working fluid discharged from said cavities of said compressible chambers through said pressure check valve and said pressure piping, when said float is moved upward such that under action of said amplified driving force said movable platform is moving upward to said immovable platform, a volume of said cavities is decreased and spring-loaded compression of bodies of said compressible chambers is increased, said driving pulleys are rotated under action of buoyancy force and decreased free length of inner driving flexible links by reeling up of said inner driving flexible links on said driving pulleys, o. providing a suction of said working fluid from a source of said working fluid, which said source is hydraulically connected to the inlet of a suction check valve and through the outlet of said suction check valve into said cavities, when under action of a selected pressure in the source of said working fluid said suction check valve is opened, when under action of said spring-loaded compression of bodies of said compressible chambers said movable platform is stroked downward relative to said immovable platform, said driving pulleys are rotated and an increased free length of inner driver flexible links is accompanied by increasing of the volume of said cavities, reducing the pressure inside said cavities, and closing said pressure check valve under action of a backward pressure of said working fluid in said pressure piping when said float is moved downward, p. transferring a force of said spring-loaded compression of bodies of said compressible chambers through said inner driving flexible links and said driving pulleys, which are fixed on said common rotated shaft with said pulley-converter under action of said force, such that the free length of said outer power flexible link is reduced by reeling up on said pulley-converter under action of said spring-loaded force, when said float is moving downward.

2. A method as claimed in claim 1 wherein a source of said working fluid is a surrounding body of water with the selected pressure equal to the height of the water column from the surface water level to said suction check valve for an open loop of the circulated water.

3. A method as claimed in claim 1 wherein a source of said working fluid is said source of any selected working fluid returned back from the consumer of useful power with a selected lower pressure through said suction piping connected to the outlet of said consumer at one side and at another side to said inlet of said suction check valve hydraulically connected to said cavities of said compressible chambers for a closed loop of the circulated working fluid.

4. A method as claimed in claim 1 wherein an extracted portion of useful power in the form of a flow of said high pressurized working fluid discharged from said cavities of said compressible chambers is transported to the consumer through pressure piping, the pressure piping summarizing extracted portions of useful power in the form of flows of said high pressurized working fluid discharged from cavities of a plurality of Advanced High Energy Wave Power Modules disposed in the surrounding body of water to a depth at which the water is under the selected pressure and with a configuration according to a selected model of swells and waves that will provide operation of Advanced High Energy Wave Power Modules.

5. An apparatus of an Advanced High Energy Wave Power Module and each of a plurality of said Advanced High Energy Wave Power Modules for generating energy on an industrial scale from an energy source of swells and waves, said apparatus comprising:

a float jointed to an upper end of an outer power flexible link, an outer power flexible link with a variable length directed by a guide roller to a pulley-converter with a circumference equal to or more than the design height of a wave, and jointed by a lower end of the outer power flexible link to a pulley-converter mounted rigidly on a common shaft rotated with driving pulleys, the rotated shaft being mounted rigidly through brackets on an immovable platform, said immovable platform connected to a supporting structure submerged in a surrounding body of water to a depth at which water is under a selected pressure, a movable platform, which has a selected upward and downward stroke relative to said immovable platform such that said selected upward and downward stroke is less than or equal to the design height of a wave times the ratio of the diameter of said pulley-converter to the diameter of said driving pulley, compressible chambers with variable volumes and spring-loaded compression of bodies in parallel and jointed by their upper bases to said immovable platform and their lower bases to said movable platform, at least two driving pulleys with their circumferences equal to or more than the selected stroke of said movable platform, which is mounted rigidly on said common rotated shaft with said pulley-converter, at least two inner driving flexible links with variable length each jointed by its upper end to each driving pulley, respectively, and each jointed by its lower end to said movable platform, cavities of said compressible chambers, with variable volumes filled with working fluid, connected through pressure openings in said upper bases to pressure conduits connected to an inlet of at least one pressure check valve, and connected through the suction openings in said upper bases to suction conduits connected to an outlet of at least one suction check valve, at least one said pressure check valve, an outlet of which is connected hydraulically through pressure piping to a consumer of useful power in the form of a discharged flow of high pressurized working fluid when said pressure check valve is opened and said suction check valve is closed and disconnects hydraulically said cavities to a source of the working fluid under action of an increased pressure inside of said cavities under action by a driving force, as said float moves upward under action of passing swells and waves, at least one said suction check valve, the inlet of which is connected hydraulically to one of the sources of said working fluid, the source being a surrounding body of water with the selected pressure equal to the height of the water column from the surface water level to said suction check valve for an open loop of the circulated water or any selected working fluid with a selected lower pressure returned back from the consumer of useful power through said suction piping connected to the outlet of said consumer at one side and at another side to said inlet of said suction check valve hydraulically connected to said cavities of said compressible chambers for a closed loop of the circulated working fluid, which is sucked into said cavities under action of difference in pressures of said source of the working fluid and a pressure inside said cavities, when said suction check valve is opened and connects hydraulically a source of said working fluid to said cavities, and said pressure check valve is closed and disconnects hydraulically to the consumer of useful power under action of a lowered pressure inside said cavities, as said float moves downward under action of its own weight.

6. An apparatus as claimed in claim 5 wherein said guide roller is rotated on a shaft mounted rigidly to said immovable platform.

7. An apparatus as claimed in claim 5 wherein said compressible chambers comprise a number of single compressible chambers connected hydraulically in parallel, or a number of assemblies of two or more compressible chambers connected hydraulically in parallel and jointed by the corresponding lower and upper bases in series, such that said cavities of said compressible chambers are connected in series through the openings in the jointed bases, and are fixed by the uppermost upper bases to said immovable platform and by the lowest lower bases to said movable platform.

8. An apparatus as claimed in claim 5 wherein said plurality of said Advanced High Energy Wave Power Modules for generating energy on an industrial scale from an energy source of swells and waves comprise supporting structure jointed to said Advanced High Energy Wave Power Modules, each of which is connected through said suction check valve or a plurality of said suction check valves to the source of working fluid and connected through said pressure check valve or a plurality of said pressure check valves to pressure piping, which is connected to the consumer of useful energy and summarizes flow of said high pressurized working fluid.

* * * * *